United States Patent
Yoo et al.

(10) Patent No.: US 9,725,818 B2
(45) Date of Patent: Aug. 8, 2017

(54) METHOD FOR MANUFACTURING LIGHT-REFLECTION ALUMINUM DOOR FRAME MOLDING

(71) Applicant: Hyundai Motor Company, Seoul (KR)

(72) Inventors: Chang Yeol Yoo, Gyeonggi-Do (KR);
Chul Hong Bae, Gyeonggi-Do (KR);
Kwang Min Yoon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 67 days.

(21) Appl. No.: 14/827,557

(22) Filed: Aug. 17, 2015

(65) Prior Publication Data
US 2015/0354082 A1    Dec. 10, 2015

Related U.S. Application Data

(62) Division of application No. 13/688,119, filed on Nov. 28, 2012, now Pat. No. 9,132,474.

(30) Foreign Application Priority Data

Jul. 20, 2012 (KR) .................. 10-2012-0079633

(51) Int. Cl.
*B05D 7/00* (2006.01)
*C25D 11/18* (2006.01)
(Continued)

(52) U.S. Cl.
CPC ............. *C25D 11/18* (2013.01); *B05D 7/53* (2013.01); *B05D 7/546* (2013.01); *B21D 5/02* (2013.01);
(Continued)

(58) Field of Classification Search
CPC ...... B60J 5/0483; B60J 5/0402; B60J 5/0406; B05D 7/53; B05D 7/546; B05D 2701/00;
(Continued)

(56) References Cited

U.S. PATENT DOCUMENTS 3,996,115 A * 12/1976 Kessler .................. C23C 22/00
                                                205/316
4,291,076 A *  9/1981 Katoh .................... B60R 13/07
                                                293/126
(Continued)

FOREIGN PATENT DOCUMENTS

JP       07-034292 A    2/1995
JP       10-130883      5/1998
(Continued)

OTHER PUBLICATIONS

Cramer, Stephen D. Covino, Bernard S., Jr.. (2003). ASM Handbook, vol. 13A—Corrosion: Fundamentals, Testing, and Protection. ASM International. Online version available at: http://app.knovel.com/hotlink/toc/id:kpASMHVAC8/asm-handbook-volume-13a/asm-handbook-volume-13a.*

(Continued)

*Primary Examiner* — Jason L Vaughan
(74) *Attorney, Agent, or Firm* — Mintz Levin Cohn Ferris Glovsky and Popeo, P.C.; Peter F. Corless

(57) ABSTRACT

Disclosed is a method for manufacturing a light-reflection aluminum door frame molding which comprises a multi-coating-applied aluminum material to thereby improve corrosion resistance and reduce costs. A method for manufacturing a light-reflection aluminum door frame molding includes cutting a metallic plate into a predetermined size, performing anodizing on the metallic plate to form an oxidized film on a surface thereof, performing opaque clear coating and transparent coating on the metallic plate to implement light reflection, and performing press molding on the metallic plate to provide the metallic plate in the shape of a door frame molding.

4 Claims, 4 Drawing Sheets

(51) Int. Cl.

| | |
|---|---|
| *C25D 11/24* | (2006.01) |
| *C25D 11/04* | (2006.01) |
| *B21D 5/02* | (2006.01) |
| *B21D 35/00* | (2006.01) |
| *B21D 53/88* | (2006.01) |
| *B60J 5/04* | (2006.01) |
| *B21K 23/00* | (2006.01) |
| *E06B 1/12* | (2006.01) |
| *C09D 5/33* | (2006.01) |

(52) U.S. Cl.
CPC ........... *B21D 35/001* (2013.01); *B21D 53/88* (2013.01); *B21K 23/00* (2013.01); *B60J 5/0463* (2013.01); *B60J 5/0483* (2013.01); *C09D 5/004* (2013.01); *C25D 11/04* (2013.01); *C25D 11/24* (2013.01); *E06B 1/12* (2013.01); *B05D 2701/00* (2013.01); *Y10T 428/265* (2015.01)

(58) Field of Classification Search
CPC ........... C09D 5/004; E06B 1/12; B21K 23/00; C25D 11/18; C25D 11/24; C25D 11/243; C25D 11/246; C25D 11/02; C25D 11/04
USPC ............... 205/153, 152, 116, 138, 139, 324; 29/527.1, 527.2, 460, 458, 453, 428, 29/527.4, 335, 33 T; 428/687
See application file for complete search history.

(56) References Cited

U.S. PATENT DOCUMENTS

| | | | | |
|---|---|---|---|---|
| 4,656,784 | A * | 4/1987 | Brachmann | B60J 10/24 49/374 |
| 4,681,668 | A * | 7/1987 | Davies | C25D 11/08 205/139 |
| 4,737,246 | A * | 4/1988 | Powers | C25D 11/08 205/116 |
| 5,156,720 | A * | 10/1992 | Rosenfeld | C23C 14/0005 156/233 |
| 5,290,424 | A * | 3/1994 | Mozelewski | C23C 22/06 156/272.6 |
| 5,463,804 | A * | 11/1995 | McCleary | C09J 5/02 29/469.5 |
| 5,478,414 | A * | 12/1995 | Mozelewski | B05D 5/083 148/265 |
| 5,637,404 | A * | 6/1997 | Bombalski | B05D 5/083 148/247 |
| 5,725,683 | A * | 3/1998 | Serafin | B05D 7/14 148/257 |
| 5,955,147 | A * | 9/1999 | Serafin | B05D 5/083 156/200 |
| 5,985,046 | A * | 11/1999 | Serafin | B05D 7/14 148/243 |
| 5,998,044 | A * | 12/1999 | Limbach | B21B 1/227 101/453 |
| 6,067,189 | A * | 5/2000 | Gillich | G02B 5/0833 359/359 |
| 6,328,359 | B1 * | 12/2001 | Pacella | B60J 5/0425 293/128 |
| 7,166,205 | B2 * | 1/2007 | Kuo | C25D 11/22 205/174 |
| 7,182,475 | B2 * | 2/2007 | Kramer | F21S 48/1394 359/507 |
| 7,484,287 | B2 * | 2/2009 | Tamura | B23P 19/047 29/451 |
| 8,080,296 | B2 * | 12/2011 | Malek | B29C 45/14 264/259 |
| 8,317,253 | B2 * | 11/2012 | Sachdev | B60J 5/0405 296/146.2 |
| 8,932,424 | B2 * | 1/2015 | Johnson | B32B 15/08 156/232 |
| 2003/0201182 | A1 * | 10/2003 | Nakamura | B05D 7/14 204/484 |
| 2010/0186301 | A1 * | 7/2010 | Drozd | B60J 5/0402 49/490.1 |

FOREIGN PATENT DOCUMENTS

| | | |
|---|---|---|
| JP | 2009-241351 A | 10/2009 |
| KR | 10-1998-0008353 | 4/1998 |
| KR | 10-0733478 B1 | 6/2007 |
| KR | 10-2008-0001718 A | 1/2008 |
| KR | 10-2008-0096002 A | 10/2008 |

OTHER PUBLICATIONS

Notice of Allowance for Korean Patent Application No. 10-2012-0079633, issued Feb. 16, 2015 by the Korea Intellectual Property Office, 3 pages.

* cited by examiner ns during the anodizing step of FIG. 3 according to an embodiment of the present invention;

METHOD FOR MANUFACTURING LIGHT-REFLECTION ALUMINUM DOOR FRAME MOLDING

CROSS-REFERENCE TO RELATED APPLICATION

This application is a divisional application of U.S. application Ser. No. 13/688,119, filed Nov. 28, 2012 which claims under 35 U.S.C. §119(a) the benefit of Korean Patent Application No. 10-2012-0079633 filed on Jul. 20, 2012, the entire contents of which are incorporated herein by reference.

BACKGROUND (a) Technical Field

The present invention relates to a method for manufacturing a light-reflection aluminum door frame molding. More particularly, the present invention relates to a method for manufacturing a light-reflection aluminum door frame molding which reduces costs and provides improved corrosion resistance.

(b) Background Art

Generally, a door frame molding installed in a vehicle's door is structured such that a molding 4 manufactured with a metallic material is fixed to an externally exposed portion of a door frame 3, and the molding 4 is mounted on a door outer panel 5, as shown in FIG. 1.

As the metallic material, metals such as stainless, aluminum, and the like are used to provide an elegant exterior appearance.

The door frame molding 4 also typically uses a light-reflection material to reflect light with a light-reflection technique.

An example of a conventional light-reflection material implemented with the light-reflection technique involves roughening a surface made of a stainless steel material (SUS) by a micro-surface-treated roll. In particular, as shown in FIG. 2, by forming an emboss 2 on a surface of a SUS material 1, a light-reflection SUS molding causing diffused reflection can be implemented.

However, the light-reflection SUS molding manufactured with the light-reflection implementing method which causes diffused reflection by the emboss 2 has a corrosion resistance problem related to red rust generated in a vehicle corrosion evaluation stage. Further, due to dark colors resulting from the method, it may be unacceptable to customers who desire bright colors.

As another example of the conventional light-reflection material implemented with the light-reflection technique, a light-reflection aluminum molding capable of reflecting light through chemical polishing and anodizing after buffing may be implemented.

However, in the case of the light-reflection aluminum molding, a corrosion resistance problem, such as generation of white rust, occurs in a field. In addition, such moldings may not provide adequate resistance to environmental conditions, and such a technique increases costs by two times the SUS material.

SUMMARY OF THE DISCLOSURE

The present invention has been made in an effort to solve the above-described problems associated with prior art, and provides an improved method for manufacturing a light-reflection aluminum door frame molding. According to the present method, a multi-coating-applied aluminum material is applied instead of a light-reflection SUS material as a material for a door frame molding, thereby improving corrosion resistance and reducing costs as compared with conventional techniques.

In one aspect, the present invention provides a method for manufacturing a light-reflection aluminum door frame molding that includes: cutting a metallic plate into a predetermined size and performing anodizing on the metallic plate to form an oxidized film on a surface of the metallic plate, performing opaque clear coating and transparent coating on the metallic plate on which the oxidized film has been formed to implement light reflection, and performing press molding on the metallic plate on which the oxidized film has been formed and light reflection has been implemented, so as to provide the form of a door frame molding. Door frame moldings thus manufactured provide increased corrosion resistance and cost reduction.

According to various embodiments, the metallic plate is made of an aluminum material. While aluminum is a preferred material, other metals that have been conventionally used in forming vehicle door frame moldings could also be used, as well as mixtures of metals.

According to various embodiments, the thickness of the oxidized film after the anodizing step is 1-3 μm.

According to various embodiments, the coating liquid used for the opaque clear coating can further contain a matting agent in a transparent clear coating liquid, such coatings can provide light reflection on a surface of a metal.

According to various embodiments, during formation of the clear coating, as roll coating conditions, a speed of 5-7 m/min and a temperature of 50-70° C. are maintained.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

Figure 1:
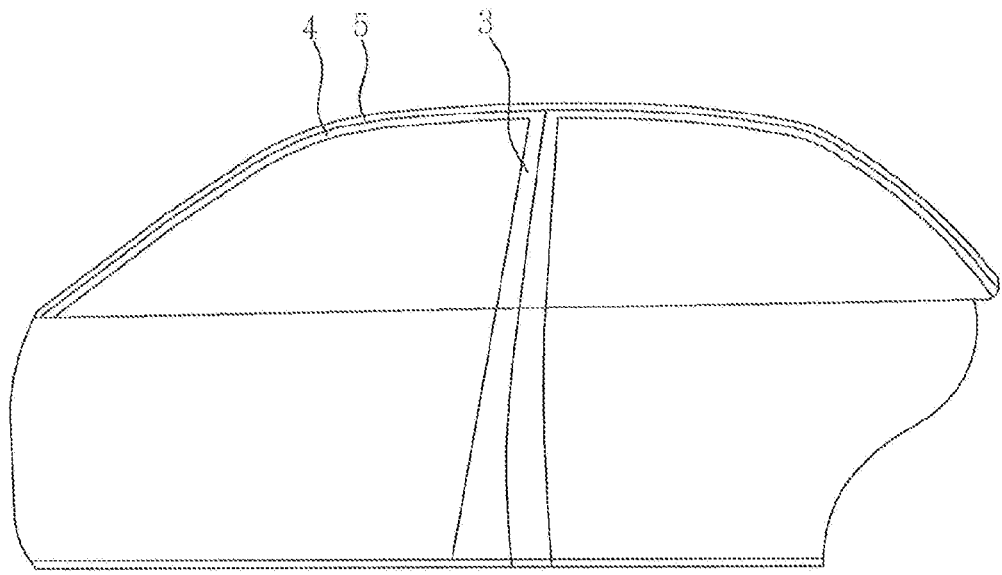
FIG. 1 is a front view showing a conventional door frame molding.
Figure 2:
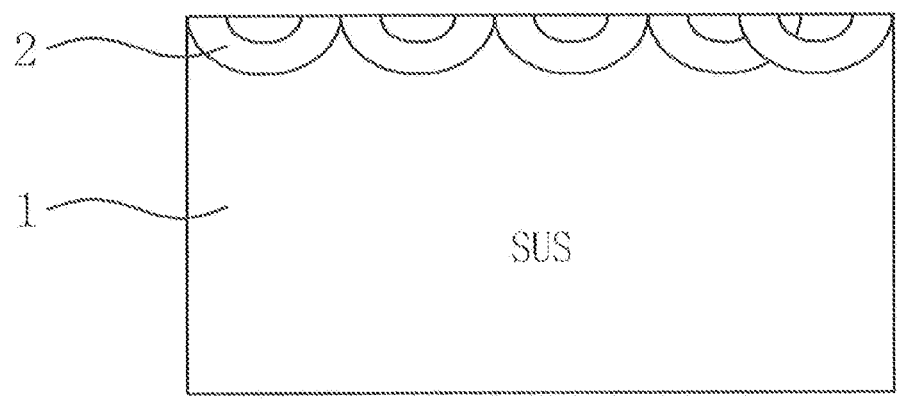
FIG. 2 is a cross-sectional view of a conventional light-reflection SUS molding.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The present invention relates to a method for manufacturing a light-reflection aluminum door frame molding, by which a corrosion resistance is improved and costs can be reduced.

As a material for manufacturing a door frame molding according to the present invention, aluminum metal having superior corrosion resistance and reflective index may be used.

In particular, as an exemplary aluminum metal, an A1050 component may be used. It's the composition and content of the A1050 component are provided below in Table 1.

TABLE 1

| | Cr | Cu | Fe | Mg | Mn | Si | Ti | Zn | Al |
|---|---|---|---|---|---|---|---|---|---|
| 1050 | — | 0.05 Max. | 0.40 Max. | 0.05 Max. | 0.05 Max. | 0.25 Max. | 0.03 Max. | 0.05 Max. | Balance |

The A1050 component is pure aluminum (with the above trace components), and can be suitably used for a variety of components such as a reflection plate, an illuminator, a decoration, a chemical-industrial tank, a conductor, etc., due to it's good formability, weldability, and corrosion resistance in spite of low rigidity.

Figure 3:
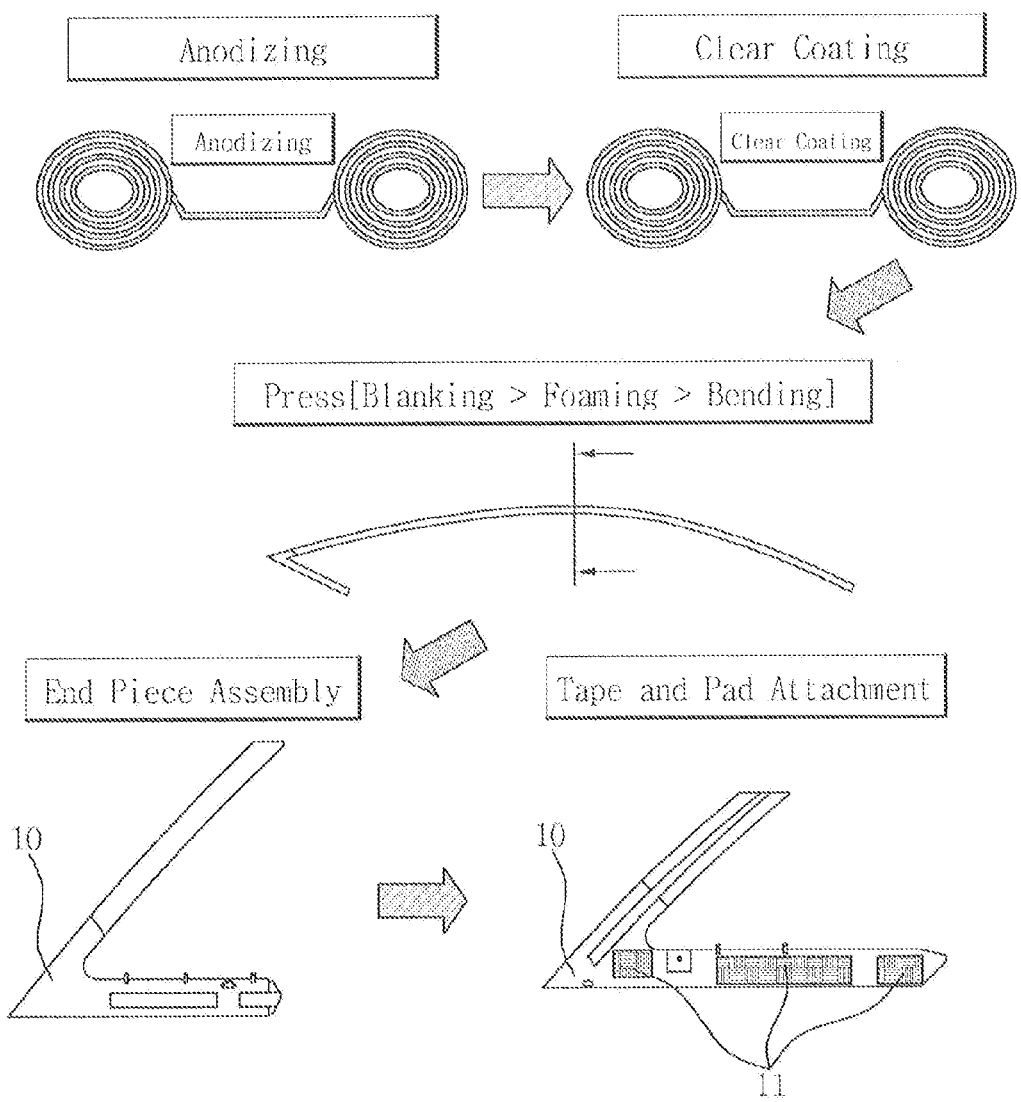
FIG. 3 is a manufacturing processing diagram of a light-reflection aluminum door frame molding according to an embodiment of the present invention.
Figure 4:
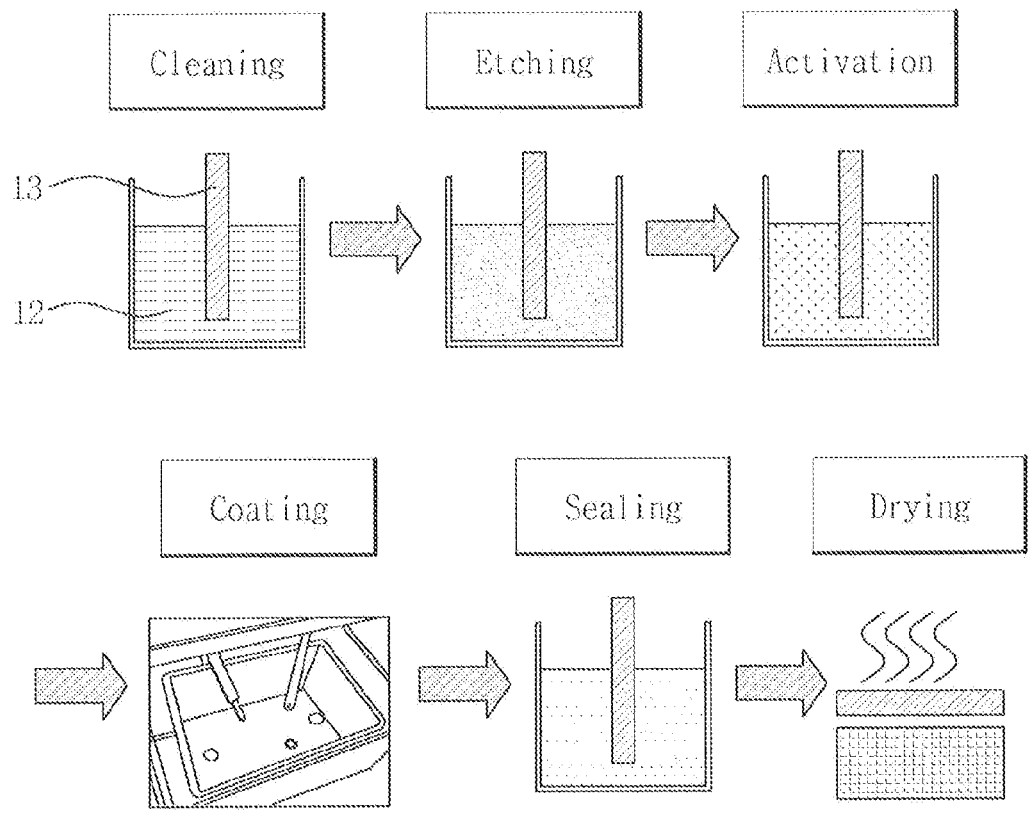
FIG. 4 is a processing diagram of detailed processes in the anodizing processing step of FIG. 3 according to an embodiment of the present invention.

FIG. 3 is a manufacturing processing diagram of a light-reflection aluminum door frame molding according to an embodiment of the present invention, and FIG. 4 is a processing diagram of detailed processes in the anodizing processing step of FIG. 3.

As shown in FIG. 3, the method for manufacturing a light-reflection metal door frame molding according to an embodiment of the present invention includes anodizing, clear coating (which can include application of multiple clear coats), and press-molding. Various metals, preferably aluminum such as an aluminum metallic (A1050) plate, can be used in the method.

Anodizing is a term that incorporates anode and oxidizing, and thus relates to a process in which a metal (a part) is placed on an anode and is electrolyzed in a diluted-acid liquid, to thereby form an oxidized film (oxidized aluminum: $Al_2O_3$) having high adhesion with the base metal by oxygen generated in the anode.

A representative material for anodizing is Al. In an anodizing process carried out on aluminum alloys, if aluminum is electrolyzed on an anode, a portion (e.g., half) of the surface of aluminum is corroded and an oxidized aluminum film is formed on the other portion (e.g., other half).

According to an embodiment of the invention, the anodizing processing may be divided into a series of steps, such as cleaning→etching→activation→coating→sealing→drying, as shown in FIG. 4. According to an embodiment of the invention, prior to execution of the divided processes, the aluminum plate 13 is cut into a desired size. For example, the aluminum plate 13 can be A1050 as described in Table 1, and can be cut to have a thickness of about 0.5-0.8 mm and a length of about 500-1250 mm. After cutting, anodizing can then be performed thereon, for example, in a continuous anodizing chamber.

According to embodiments of the invention, a continuous anodizing chamber is used in which the aluminum is passed through the series of processes through rollers. By modifying conditions, such as roll speed, properties of the resulting anodized aluminum material can be adjusted as desired. According to exemplary embodiments, a roll speed for the anodizing process is carried out at about 4-10/min, to provide a plate 13 that has micron-scale thickness after anodizing and coating. In particular, a roll speed of about 7 m/min provides, after anodizing, a plate 13 having a thickness of about 1-3 μm.

As shown in FIG. 4, the anodizing process can include cleaning, etching, activation, coating, sealing, and drying. These steps can be carried out by adding a suitable solution 12, such as those described in Table 2, to each bath of FIG. 4.

TABLE 2

| Process | Composition (Aqueous Solution) | Condition |
|---|---|---|
| Cleaning | 30 g/l Na$_3$Po$_4$ | Cathode Cleaning for 0.5-3 minutes, Current Intensity 1-4 A/dm, 4-6 V |
| Etching | 180 g/l CrO$_3$ | Soaking for 3 minutes at 20-30° C. |
| Activation | 2-4 g/l KOH | Soaking for 2 minutes at 20-30° C. |
| Coating | 10-15 g/l Na$_2$SiO$_3$_9H$_2$O 3-5 g/l KF_2H$_2$O 2-4 g/l KOH | Apply Voltage of 50-70 V for 1-2 minutes at 40° C. |
| Sealing | ethylene | Soaking for 1 minute at 20-30° C. |
| Drying | — | Maintain for 10-20 minutes at 90 ± 10° C. |

Cleaning and etching are steps for removing foreign substances from surfaces of a product, and activation is a step for neutralizing an oxidized surface to facilitate coating.

Sealing is a step for filling up holes on the anodized surface, and drying is a step for facilitating permeation of a sealing liquid into the holes.

Through the foregoing processing steps, an Al$_2$O$_3$ anodized film having a desired thickness, such as a thickness of about 1-3 μm, is formed on the aluminum plate 13.

The anodizing mechanism is a reaction between water and aluminum, and Na$_2$SiO$_3$.9H$_2$O, KF.2H$_2$O, and KOH of a coating liquid facilitate ionization of water.

This mechanism can be expressed as follows:

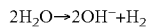

$$2H_2O \rightarrow 2OH^- + H_2$$

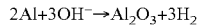

$$2Al + 3OH^- \rightarrow Al_2O_3 + 3H_2$$

Corrosion resistance of the surface of the product can be maintained by the anodized film generated as described above.

Figure 5:
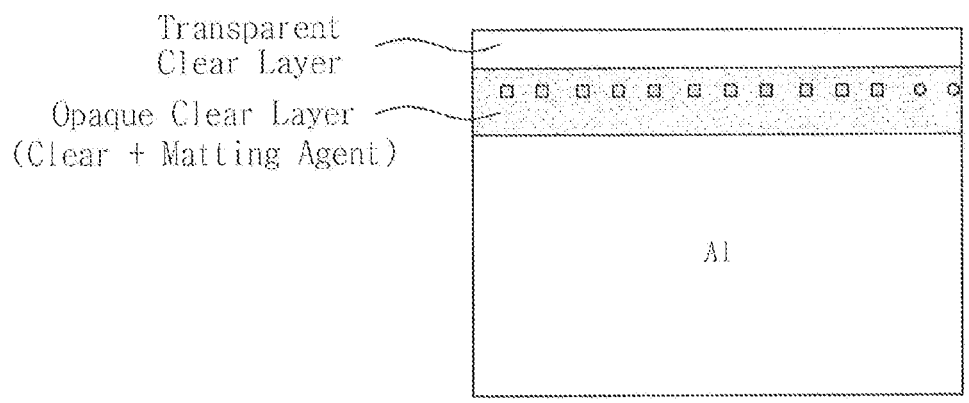
FIG. 5 is a cross-sectional view of an aluminum door frame molding which has been multi-clear coated according to an embodiment of the present invention.

FIG. 5 is a cross-sectional view of an aluminum door frame molding which is clear coated with multiple layers (e.g. an opaque clear layer and a transparent clear layer) according to the present invention.

Next, clear coating is performed, which is also called glass-film coating. During clear coating, the outermost portion of a coated material is coated with a first layer, and a transparent coating film protects the coated material from an external physical force, weather, and industrial and natural chemical factors (e.g., excrement of birds).

According to various embodiments, clear coating includes primary clear coating (opaque coating) and secondary clear coating (transparent coating). As shown in FIG. 5, an opaque clear coating layer and a transparent clear coating layer are sequentially formed on the surface of an aluminum base material and are combined, thus providing light reflection.

Compositions and contents of a primary clear coating liquid and a secondary clear coating liquid according to various embodiments of the invention are as shown in Table 3 and Table 4, wherein wt % are relative to the total weight of the coating liquid.

TABLE 3

| Chemical Substance Name | CAS No. | Contents (wt %) |
|---|---|---|
| Cyclohexanone | 108-94-1 | 15-20 wt % |
| Blocked Isocyanate | — | 20-30 wt % |
| Polyester | — | 30-40 wt % |
| Aromatic Solvent | 64742-95-6 | 15-20 wt % |
| Micronized Silica | 7631-86-9 | 4-8 wt % |
| Others | — | 1-5 wt % |

TABLE 4

| Chemical Substance Name | CAS No. | Contents (wt %) |
|---|---|---|
| Cyclohexanone | 108-94-1 | 20-30 wt % |
| Blocked Isocyanate | — | 20-30 wt % |
| Polyester | — | 30-40 wt % |
| Aromatic Solvent | 64742-95-6 | 15-20 wt % |
| Others | — | 1-5 wt % |

The primary clear coating liquid can be made opaque or semi-transparent by further adding a matting agent (which is an additive used to reduce gloss) to a binder or an organic solvent. The secondary clear coating liquid can be composed only with an organic solvent and is transparent because a pigment is not added thereto.

In clear coating. In order to impart desired coating characteristics, various roll coating conditions can be selected. For example, according to an exemplary embodiment, a speed of 5-7 m/min and a temperature of 50-70° C. are maintained to provide a suitable clear coating.

Next, press molding is performed, which includes blanking→foaming→bending, as shown in FIG. 3. Press molding can be carried out under a variety of conditions and, for example, are preferably carried out under a 150-250 ton press, more preferably a 200-ton press.

After press molding, an end piece 10 is assembled and a tape and pads 11 are attached, thereby forming the door frame molding.

Figure 6:
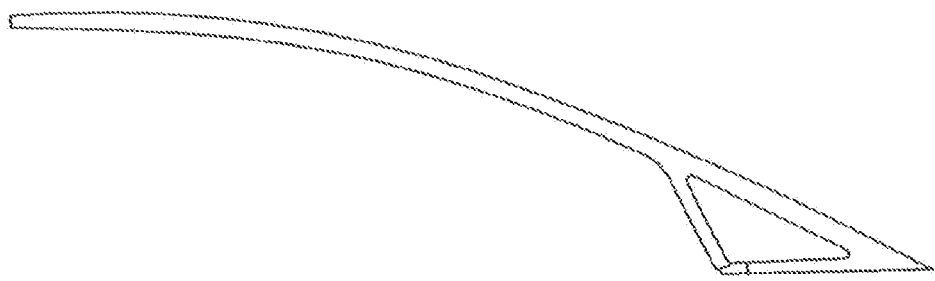
FIG. 6 is a picture of an aluminum door frame molding manufactured according to a manufacturing of the present invention.

FIG. 6 is a drawing of a door frame molding manufactured according to a method for manufacturing a light-reflection aluminum door frame molding of the present invention.

Comparisons between a multi-coating light-reflection aluminum door frame molding according to the present invention and a light-reflection SUS molding according to prior art in a vehicle corrosion test demonstrate that the door frame molding according to the present invention has superior corrosion resistance when passing through clear coating and anodizing than a conventional SUS molding.

That is, the SUS molding has corrosion in 6 Phase; whereas the Al molding according to the present invention has no corrosion in 12 Phase.

The method for manufacturing the light-reflection aluminum door frame molding according to the present invention has a variety of advantages, such as those described below.

According to the present invention, an aluminum metal is used as a material for a door frame molding, and surface-treatment processing of anodizing and multi-clear coating is applied to the aluminum metal, thereby improving a corrosion resistance of the product and reducing the cost when compared to a conventional technique.

While an exemplary embodiment of the present invention has been described in detail, the protection scope of the present invention is not limited to the foregoing embodiment and it will be appreciated by those skilled in the art that various modifications and improvements using the basic

| [Description of Reference Numerals] | |
|---|---|
| 1: SUS Material | 2: Emboss |
| 3: Door Frame | 4: Molding |
| 5: Outer Panel | 11: Pad |
| 10: End Piece | 13: Aluminum Metallic Plate |
| 12: Solution | |

What is claimed is:

1. A light-reflection aluminum door frame molding formed by a method comprising:

cutting a metallic plate into a predetermined size and performing anodizing on the metallic plate to form an oxidized film on a surface of the metallic plate;

performing a primary clear coating and a second clear coating sequentially on the metallic plate to provide light reflection; and performing press molding on the metallic plate to provide the metallic plate in the form of the light-reflection aluminum door frame molding, wherein the light-reflection aluminum door frame molding comprises the metallic plate, the oxidized film formed on the surface of the metallic plate, the primary clear coating layer formed on the oxidized film and the secondary clear coating layer sequentially formed on the primary clear coating layer, and wherein the primary clear coating layer is formed with a binder and a matting agent added to the binder thereby being formed opaque or semi-transparent, and the secondary clear coating layer is formed with the binder only thereby being transparent.

2. The door frame molding of claim 1, wherein the metallic plate is made of an aluminum material.

3. The door frame molding of claim 1, wherein a thickness of the oxidized film after anodizing is about 1-3 μm.

4. The door frame molding of claim 1, wherein the clear coating is carried out as a continuous process using one or more rollers and, as roll coating conditions, a speed of about 5-7 m/min and a temperature of about 50-70° C. are maintained.

* * * * *